United States Patent
Croak et al.

(10) Patent No.: US 8,804,539 B2
(45) Date of Patent: *Aug. 12, 2014

(54) METHOD AND APPARATUS FOR DETECTING SERVICE DISRUPTIONS IN A PACKET NETWORK

(75) Inventors: Marian Croak, Fair Haven, NJ (US); Hossein Eslambolchi, Los Altos Hills, CA (US)

(73) Assignee: AT&T Intellectual Property II, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/615,481

(22) Filed: Sep. 13, 2012

(65) Prior Publication Data
US 2013/0003563 A1 Jan. 3, 2013

Related U.S. Application Data

(63) Continuation of application No. 11/112,898, filed on Apr. 22, 2005, now Pat. No. 8,284,679.

(51) Int. Cl.
*H04J 1/16* (2006.01)
*H04L 12/24* (2006.01)

(52) U.S. Cl.
CPC ................................ *H04L 41/0609* (2013.01)
USPC ........................... 370/242; 370/252; 709/224

(58) Field of Classification Search
USPC ................ 370/216, 230–235, 241–253, 401; 709/223, 224
See application file for complete search history.

(56) References Cited

U.S. PATENT DOCUMENTS

| | | | |
|---|---|---|---|
| 5,809,491 A * | 9/1998 | Kayalioglu et al. | 706/45 |
| 6,922,656 B2 * | 7/2005 | Butler et al. | 702/183 |
| 7,158,022 B2 * | 1/2007 | Fallon | 340/506 |
| 8,284,679 B1 | 10/2012 | Croak et al. | |
| 2002/0120727 A1 | 8/2002 | Curley et al. | |
| 2002/0191624 A1 | 12/2002 | Onweller et al. | |
| 2002/0194319 A1 | 12/2002 | Ritche | |
| 2004/0114519 A1 | 6/2004 | MacIsaac | |
| 2004/0114583 A1 | 6/2004 | Cetin et al. | |
| 2006/0109979 A1 | 5/2006 | Afzal et al. | |
| 2006/0168170 A1 | 7/2006 | Korzeniowski | |

* cited by examiner

*Primary Examiner* — Kan Yuen

(57) ABSTRACT

A method and system for detecting service disruptions in a packet network is described. In one example, a plurality of data reports is received. A determination is then made as to whether a number of the plurality of data reports that pertain to a particular class has exceeded a predetermined threshold. In the event the threshold is exceeded, at least one notification is transmitted.

20 Claims, 4 Drawing Sheets

METHOD AND APPARATUS FOR DETECTING SERVICE DISRUPTIONS IN A PACKET NETWORK

This application is a continuation of U.S. patent application Ser. No. 11/112,898, filed Apr. 22, 2005, which is currently allowed and is incorporated by reference in its entirety.

The present invention relates generally to communication networks and, more particularly, to a method and apparatus for detecting service disruptions in packet networks, e.g., Voice over Internet Protocol (VoIP) networks.

BACKGROUND OF THE INVENTION

Customer care agents are frequently the first to learn that a large number of subscribers to VoIP residential services are experiencing a service disruption. Each customer care agent inputs information regarding a particular customer situation and attempts to resolve the problem. Due to the dispersed nature of care customer agents and their respective focus on individual treatment, an undue amount of time may elapse before it is recognized that all of the agents are receiving calls regarding one specific situation. Consequently, the response times to implement remedies for service disruptions are currently being compromised under present industry practices.

Therefore, a need exists for a method and apparatus for detecting service disruptions in a packet network, e.g., Voice over Internet Protocol (VoIP) network.

SUMMARY OF THE INVENTION

In one embodiment, a method and system for detecting service disruptions in a packet network is described. More specifically, a plurality of data reports is received. A determination is then made as to whether a number of the plurality of data reports that pertain to a particular class has exceeded a predetermined threshold. In the event the threshold is exceeded, at least one notification is transmitted.

BRIEF DESCRIPTION OF THE DRAWINGS

The teaching of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

This invention provides a tool that enables a customer device (e.g., endpoint device) to self diagnose faults that it experiences and subsequently generate a trouble ticket report, which is automatically sent to the network for resolution and logging. Upon receiving the ticket, the network can provide solutions to the equipment and take other steps necessary to resolve the problem.

Figure 1:
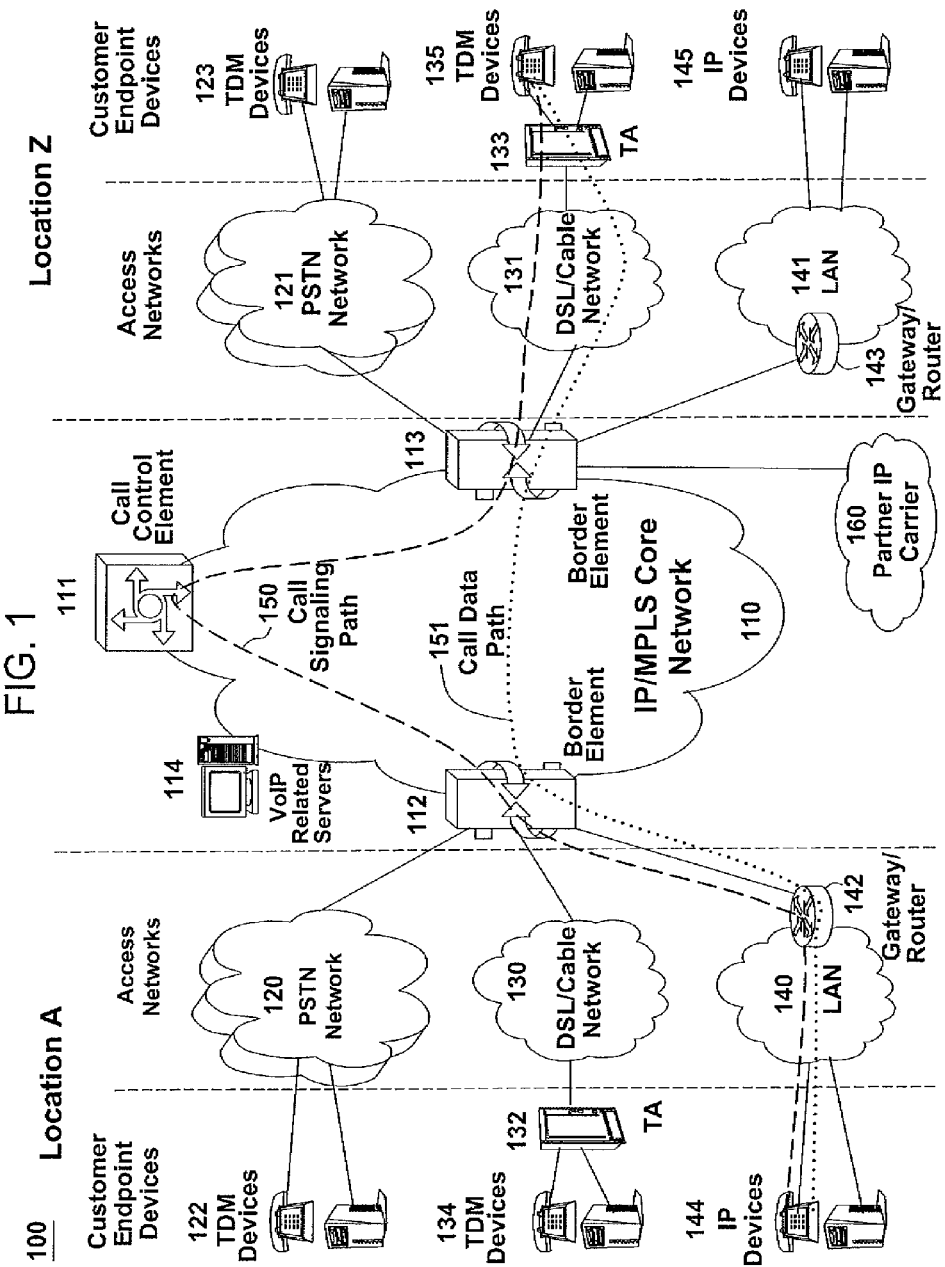
FIG. 1 illustrates an exemplary embodiment of a communications system in accordance with the present invention.

To better understand the present invention, FIG. 1 illustrates an example network, e.g., a packet network such as a VoIP network related to the present invention. Exemplary packet networks include internet protocol (IP) networks, asynchronous transfer mode (ATM) networks, frame-relay networks, and the like. An IP network is broadly defined as a network that uses Internet Protocol to exchange data packets. Thus, a VoIP network or a SoIP (Service over Internet Protocol) network is considered an IP network.

In one embodiment, FIG. 1 illustrates an example network, e.g., a packet network such as a VoIP network related to the present invention. The VoIP network may comprise various types of customer endpoint devices connected via various types of access networks to a carrier (a service provider) VoIP core infrastructure over an Internet Protocol/Multi-Protocol Label Switching (IP/MPLS) based core backbone network. Broadly defined, a VoIP network is a network that is capable of carrying voice signals as packetized data over an IP network. An IP network is broadly defined as a network that uses Internet Protocol to exchange data packets.

The customer endpoint devices can be either Time Division Multiplexing (TDM) based or IP based. TDM based customer endpoint devices 122, 123, 134, and 135 typically comprise of TDM phones or Private Branch Exchange (PBX). IP based customer endpoint devices 144 and 145 typically comprise IP phones or PBX. The Terminal Adaptors (TA) 132 and 133 are used to provide necessary interworking functions between TDM customer endpoint devices, such as analog phones, and packet based access network technologies, such as Digital Subscriber Loop (DSL) or Cable broadband access networks. TDM based customer endpoint devices access VoIP services by using either a Public Switched Telephone Network (PSTN) 120, 121 or a broadband access network via a TA 132 or 133. IP based customer endpoint devices access VoIP services by using a Local Area Network (LAN) 140 and 141 with a VoIP gateway or router 142 and 143, respectively.

The access networks can be either TDM or packet based. A TDM PSTN 120 or 121 is used to support TDM customer endpoint devices connected via traditional phone lines. A packet based access network, such as Frame Relay, ATM, Ethernet or IP, is used to support IP based customer endpoint devices via a customer LAN, e.g., 140 with a VoIP gateway and router 142. A packet based access network 130 or 131, such as DSL or Cable, when used together with a TA 132 or 133, is used to support TDM based customer endpoint devices.

The core VoIP infrastructure comprises of several key VoIP components, such the Border Element (BE) 112 and 113, the Call Control Element (CCE) 111, and VoIP related servers 114. The BE resides at the edge of the VoIP core infrastructure and interfaces with customers endpoints over various types of access networks. A BE is typically implemented as a Media Gateway and performs signaling, media control, security, and call admission control and related functions. The CCE resides within the VoIP infrastructure and is connected to the BEs using the Session Initiation Protocol (SIP) over the underlying IP/MPLS based core backbone network 110. The CCE is typically implemented as a Media Gateway Controller and performs network wide call control related functions as well as interacts with the appropriate VoIP service related servers when necessary. The CCE functions as a SIP back-to-back user agent and is a signaling endpoint for all call legs between all BEs and the CCE. The CCE may need to interact with various VoIP related servers in order to complete a call that require certain service specific features, e.g. translation of an E.164 voice network address into an IP address.

For calls that originate or terminate in a different carrier, they can be handled through the PSTN 120 and 121 or the Partner IP Carrier 160 interconnections. For originating or terminating TDM calls, they can be handled via existing PSTN interconnections to the other carrier. For originating or terminating VoIP calls, they can be handled via the Partner IP carrier interface 160 to the other carrier.

In order to illustrate how the different components operate to support a VoIP call, the following call scenario is used to illustrate how a VoIP call is setup between two customer endpoints. A customer using IP device 144 at location A places a call to another customer at location Z using TDM device 135. During the call setup, a setup signaling message is sent from IP device 144, through the LAN 140, the VoIP Gateway/Router 142, and the associated packet based access network, to BE 112. BE 112 will then send a setup signaling message, such as a SIP-INVITE message if SIP is used, to CCE 111. CCE 111 looks at the called party information and queries the necessary VoIP service related server 114 to obtain the information to complete this call. If BE 113 needs to be involved in completing the call; CCE 111 sends another call setup message, such as a SIP-INVITE message if SIP is used, to BE 113. Upon receiving the call setup message, BE 113 forwards the call setup message, via broadband network 131, to TA 133. TA 133 then identifies the appropriate TDM device 135 and rings that device. Once the call is accepted at location Z by the called party, a call acknowledgement signaling message, such as a SIP-ACK message if SIP is used, is sent in the reverse direction back to the CCE 111. After the CCE 111 receives the call acknowledgement message, it will then send a call acknowledgement signaling message, such as a SIP-ACK message if SIP is used, toward the calling party. In addition, the CCE 111 also provides the necessary information of the call to both BE 112 and BE 113 so that the call data exchange can proceed directly between BE 112 and BE 113. The call signaling path 150 and the call data path 151 are illustratively shown in FIG. 1. Note that the call signaling path and the call data path are different because once a call has been setup up between two endpoints, the CCE 111 does not need to be in the data path for actual direct data exchange.

Note that a customer in location A using any endpoint device type with its associated access network type can communicate with another customer in location Z using any endpoint device type with its associated network type as well. For instance, a customer at location A using IP customer endpoint device 144 with packet based access network 140 can call another customer at location Z using TDM endpoint device 123 with PSTN access network 121. The BEs 112 and 113 are responsible for the necessary signaling protocol translation, e.g., SS7 to and from SIP, and media format conversion, such as TDM voice format to and from IP based packet voice format.

Figure 2:
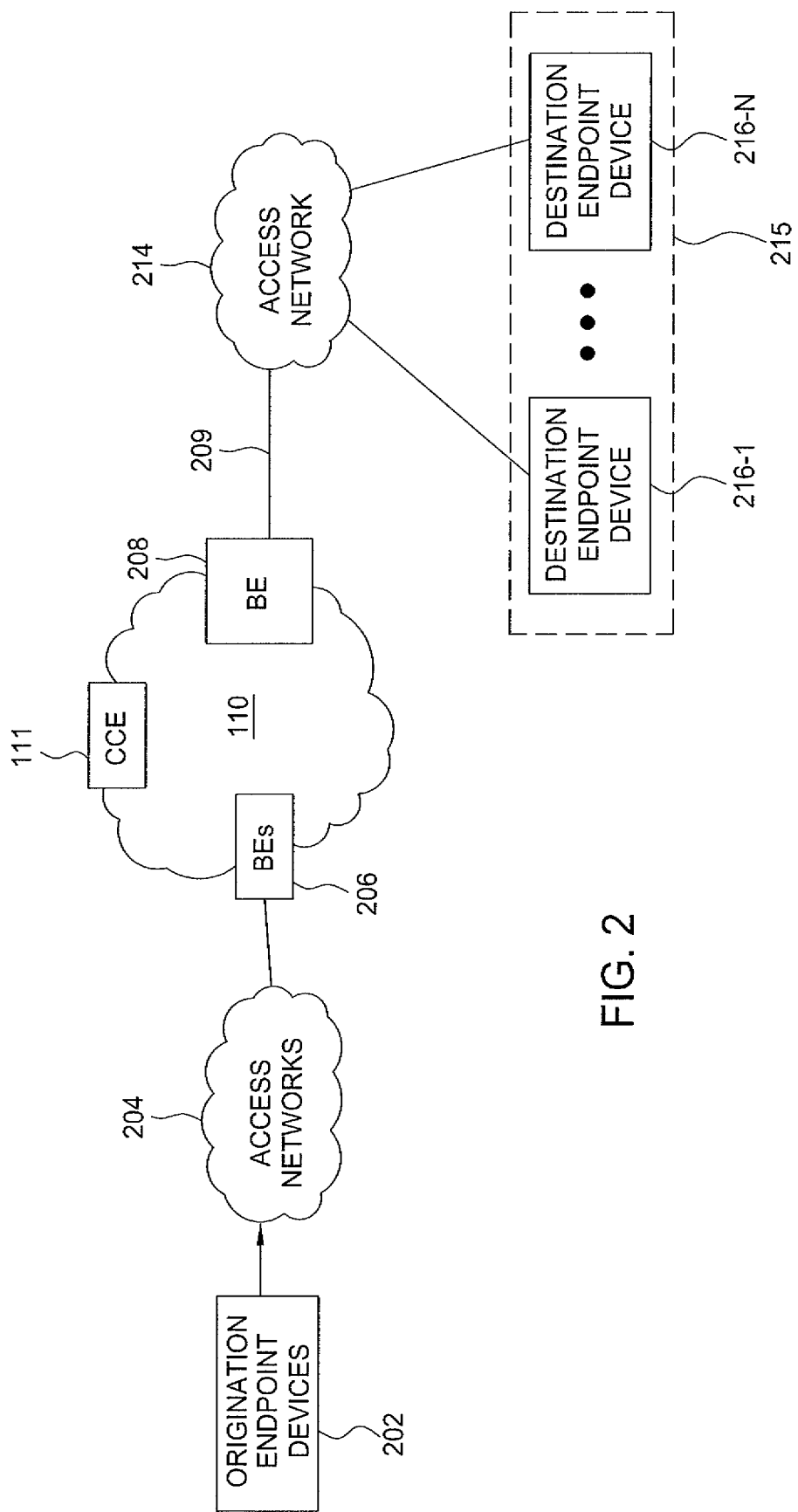
FIG. 2 is a block diagram depicting an exemplary configuration of the communication system of FIG. 1 in accordance with the invention.

FIG. 2 is a block diagram depicting an exemplary configuration of the communication system of FIG. 1 in accordance with the invention. In the present embodiment, originating endpoint devices 202 are in communication with the core network 110 through access networks 204 and BEs 206. Calls initiated by the originating endpoint devices 202 are received at the BEs 206 over the access networks 204 and are forwarded to the call control element (CCE) 111 for processing. In the present example, the customer calls are destined for a call center 215 having destination endpoint devices 216-1 through 216-N (collectively referred to as destination endpoint devices 216), where N is an integer. The destination endpoint devices 216 are in communication with the core network 110 through an access network 214 and a BE 208. The BE 208 and the access network 214 are in communication over a shared access facility 209 (e.g., a shared trunk). The originating endpoint devices 202 and the destination endpoint devices 216 may comprise any of the customer endpoint devices described above (e.g., TDM devices, IP devices, PBX, etc.). The access networks 204 and 214 may comprise any of the access networks described above (e.g., PSTN, DSL/Cable, LAN, etc).

In one embodiment, a customer service request call is received at the call center 215 and a customer care agent subsequently logs the customer problem into a trouble ticket. Typically, the care agent is responsible for classifying the problem as a certain class and corresponding severity. Once the trouble ticket has been appropriately classified, the data contained within the trouble ticket is submitted to a threshold database 216 connected to (or located within) the call center 215. The threshold database 216 collects and manages the number of trouble tickets generated at the call center 215.

Initially, the server logs the class and severity of the particular customer problem into the database. The database then conducts a check to ensure a predefined threshold has been exceeded. The predefined threshold may be a set number or percentage of trouble tickets that are generated for a certain problem class and corresponding severity (see below for more details).

Figure 3:
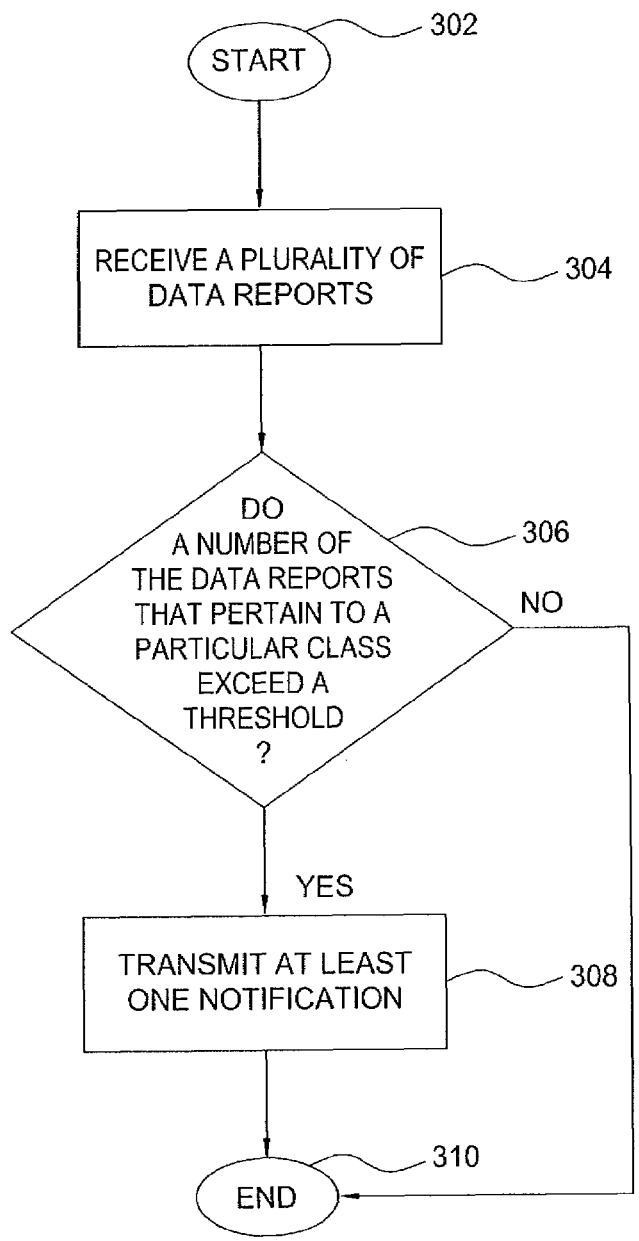
FIG. 3 illustrates a flowchart of a method for detecting service disruptions in a packet network of the present invention.

FIG. 3 is a flow diagram depicting an exemplary embodiment of a method 300 for detecting service disruptions in a packet network in accordance with the present invention. Aspects of the method 300 may be understood with reference to FIGS. 1 and 2. The method 300 begins at step 302. At step 304, a plurality of data reports is received. In one embodiment, a plurality of data reports generated by customer care agents at a customer care center are submitted to and received by a trouble ticket center or dedicated server (e.g., VoIP related server 114). In one embodiment, the data reports may comprise trouble tickets, which are electronic forms that include descriptions of the various problems being encountered by calling customers. More specifically, the description of a caller's reported problem (i.e., a "customer event") is logged into a trouble ticket by a customer care agent and is then submitted to the trouble ticketing center or dedicated collection server. Alternatively, the trouble tickets may be generated by endpoint devices and terminal adapters utilizing in the packet network. These devices may be configured to automatically submit their respective trouble tickets should problems arise.

In one embodiment, the trouble tickets may be categorized into different "classes" and corresponding severity levels. A class may be defined as the type of problem the customer is experiencing (e.g., voice mail difficulties). Similarly, the severity level may be defined as how severe the problem is classified within the spectrum of a particular class (e.g., poor voice quality vs. complete access loss). For example, if a customer cannot place a VoIP call at his residence, the trouble ticket may be designated as a VoIP connection class problem with a high severity level classification. If the customer is only experiencing poor sound quality and lack of clarity, the corresponding trouble ticket detailing this VoIP connection problem may be designated as a low severity problem. Similarly, it is to be understood by those of ordinary skill in the art that the data reports may be categorized in numerous and various types of classes and levels. Although the classification process is typically conducted by a customer care agent, other embodiments may involve a software application that classifies the trouble tickets based on the description, preset categories, and conditions (e.g., entered text, check boxes, etc.) associated with the customer problem.

At step 306, a determination of whether a number of data reports pertaining to a particular class and a given severity level exceeds a predetermined threshold is made. In one embodiment, the threshold may comprise a requirement for a predetermined number of data reports, which pertain to a particular class of problem with a designated severity level. Depending on the type of threshold, these data reports may be required to be received during a predetermined time span (e.g., a requirement for 50 trouble tickets pertaining to network access, each designated as "high severity", and have all been received in the past 15 minutes). Alternatively, the predetermined threshold may only entail a specific class severity level, and quantity of data reports without the time limit requirement. In another embodiment, the predetermined threshold may comprise a percentage of the plurality of data reports pertaining to a particular class and severity (as compared to the total number of data reports) received during a predetermined time period. In one embodiment, the threshold may comprise a requirement for a predetermined number of data reports, which only pertain to a particular class of problem.

Once a data report (e.g., trouble ticket) is classified, it is stored in a database (or like structure) of a network collection server (e.g. VoIP related server 114), which may analyze the data reports in real time. Specifically, the collection server keeps track of the number of trouble tickets that pertain to a particular class and corresponding severity level (high, medium, low, etc.). Furthermore, when the number (or alternatively, a percentage of the total number of trouble tickets) of trouble tickets of a particular class and severity level exceeds a given predetermined threshold, the method 300 continues to step 308.

At step 308, at least one notification is transmitted. In one embodiment, the notification comprises an alarm that is transmitted to a customer care center, e.g., to a supervisor agent. This alerting feature is activated so that customer care agents and managers are notified when the same class of problem of a certain severity level are occurring in a call center environment. Thus, the customer care agents and managers will be able to recognize potentially system wide network events, such as service outages or other disruptions, much sooner. Consequently, the appropriate operation centers or engineers may then be able to remedy these significant network problems with minimal down time. In another embodiment, the notification may comprise of an alarm that is directly transmitted to a communications device (personal computer, cellular phone, pager, personal digital assistant, etc.) of a customer care agent, customer care manager, and the like. Similarly, the notification may be an audible alarm, a visual alarm, text message, and the like. At step 310, the method 300 ends.

Figure 4:
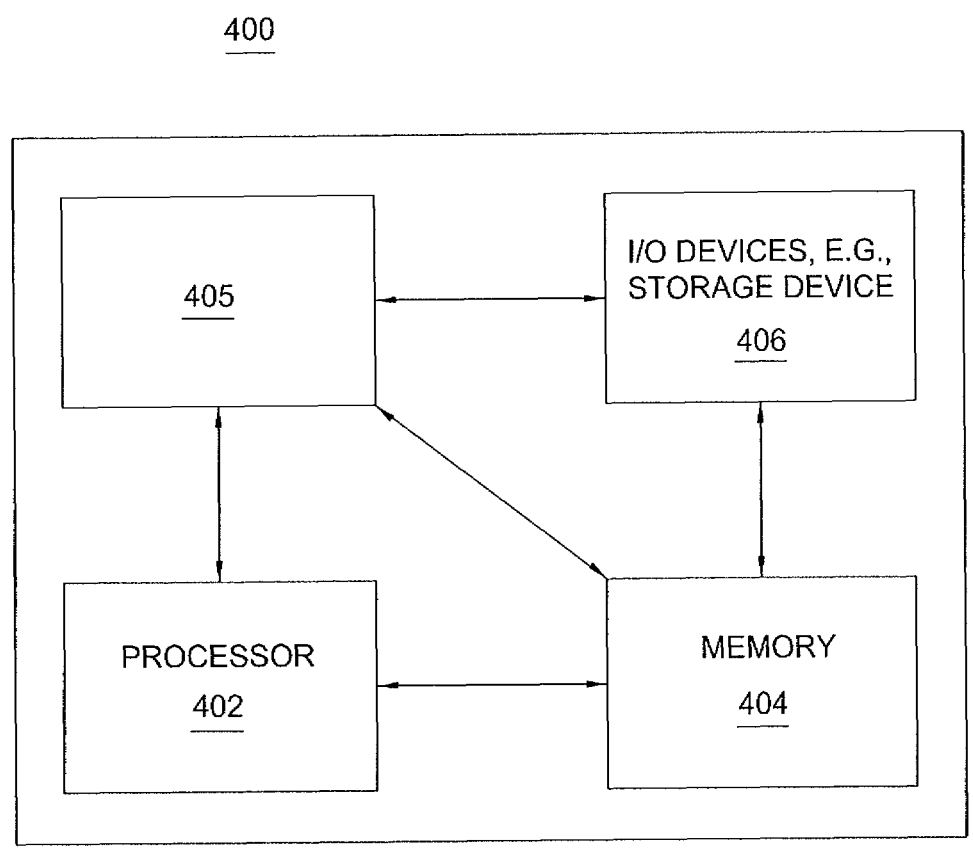
FIG. 4 illustrates a high level block diagram of a general purpose computer suitable for use in performing the functions described herein.

FIG. 4 depicts a high level block diagram of a general purpose computer suitable for use in performing the functions described herein. As depicted in FIG. 4, the system 400 comprises a processor element 402 (e.g., a CPU), a memory 404, e.g., random access memory (RAM) and/or read only memory (ROM), a service disruption detection module 405, and various input/output devices 406 (e.g., storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like)).

It should be noted that the present invention can be implemented in software and/or in a combination of software and hardware, e.g., using application specific integrated circuits (ASIC), a general purpose computer or any other hardware equivalents. In one embodiment, the present service disruption detection module or process 405 can be loaded into memory 404 and executed by processor 402 to implement the functions as discussed above. As such, the present service disruption detection process 405 (including associated data structures) of the present invention can be stored on a computer readable medium or carrier, e.g., RAM memory, magnetic or optical drive or diskette and the like.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for detecting a service disruption in a packet network, comprising:

receiving, via a processor, a plurality of data reports, the plurality of data reports associated with a plurality of customers, wherein each of the plurality of data reports comprises a trouble ticket report that logs a customer problem by a problem class and a severity level, wherein the problem class represents a type of problem a customer is experiencing and the severity level represents how severe a problem is classified within a spectrum of the problem class, wherein the spectrum of the problem class includes a higher severity level pertaining to a loss of access to the packet network and a lesser severity level pertaining to a problem that does not include a loss of access to the packet network;

determining, via the processor, whether a number of the plurality of data reports pertaining to a particular problem class and a particular severity level associated with the particular problem class has exceeded a threshold, wherein the threshold is associated with a percentage of the plurality of data reports pertaining to the particular problem class received during a time period; and transmitting, via the processor, a notification in response to the number exceeding the threshold.

2. The method of claim 1, wherein the packet network comprises an internet protocol network.

3. The method of claim 1, wherein the notification comprises an audible alarm.

4. The method of claim 1, wherein the notification is transmitted to a customer care center.

5. The method of claim 1, wherein the notification comprises a visual alarm.

6. The method of claim 1, wherein the notification comprises a text message.

7. The method of claim 1, wherein the notification is transmitted to a cellular phone.

8. The method of claim 1, wherein the notification is transmitted to a personal computer.

9. The method of claim 1, wherein the notification is transmitted to a pager.

10. The method of claim 1, wherein the notification is transmitted to a personal digital assistant.

11. The method of claim 1, wherein the notification is transmitted to a customer care agent.

12. The method of claim 1, wherein the notification is transmitted to a customer care manager.

13. An apparatus for detecting a service disruption in a packet network, comprising:

a processor; and a computer-readable medium storing a plurality of instructions which, when executed by the processor, cause the processor to perform operations, the operations comprising:

receiving a plurality of data reports, the plurality of data reports associated with a plurality of customers, wherein each of the plurality of data reports comprises a trouble ticket report that logs a customer problem by a problem class and a severity level, wherein the problem class represents a type of problem a customer is experiencing and the severity level represents how severe a problem is classified within a spectrum of the problem class, wherein the spectrum of the problem class includes a higher severity level pertaining to a loss of access to the packet network and a lesser severity level pertaining to a problem that does not include a loss of access to the packet network;

determining whether a number of the plurality of data reports pertaining to a particular problem class and a particular severity level associated with the particular problem class has exceeded a threshold, wherein the threshold is associated with a percentage of the plurality of data reports pertaining to the particular problem class received during a time period; and transmitting a notification in response to the number exceeding the threshold.

14. The apparatus of claim 13, wherein the packet network comprises an internet protocol network.

15. The apparatus of claim 13, wherein the notification comprises an audible alarm.

16. The apparatus of claim 13, wherein the notification is transmitted to a customer care center.

17. A non-transitory computer readable medium storing instructions which, when executed by a processor, causes the processor to perform operations for detecting a service disruption in a packet network, the operations comprising:

receiving a plurality of data reports, the plurality of data reports associated with a plurality of customers, wherein each of the plurality of data reports comprises a trouble ticket report that logs a customer problem by a problem class and a severity level, wherein the problem class represents a type of problem a customer is experiencing and the severity level represents how severe a problem is classified within a spectrum of the problem class, wherein the spectrum of the problem class includes a higher severity level pertaining to a loss of access to the packet network and a lesser severity level pertaining to a problem that does not include a loss of access to the packet network;

determining whether a number of the plurality of data reports pertaining to a particular problem class and a particular severity level associated with the particular problem class has exceeded a threshold, wherein the threshold is associated with a percentage of the plurality of data reports pertaining to the particular problem class received during a time period; and transmitting a notification in response to the number exceeding the threshold.

18. The non-transitory computer readable medium of claim 17, wherein the packet network comprises an internet protocol network.

19. The non-transitory computer readable medium of claim 17, wherein the notification comprises an audible alarm.

20. The non-transitory computer readable medium of claim 17, wherein the notification is transmitted to a customer care center.

* * * * *